(12) United States Patent
Fisher

(10) Patent No.: US 10,688,643 B2
(45) Date of Patent: Jun. 23, 2020

(54) STAPLE INSERTION DEVICE

(71) Applicant: Source All Media, Inc., Chaska, MN (US)

(72) Inventor: Eugene John Fisher, Chaska, MN (US)

(73) Assignee: Source All Media, Inc, Chaska, MN (US)

( * ) Notice: Subject to any disclaimer, the term of this patent is extended or adjusted under 35 U.S.C. 154(b) by 332 days.

(21) Appl. No.: 15/467,215

(22) Filed: Mar. 23, 2017

(65) Prior Publication Data

US 2017/0274514 A1    Sep. 28, 2017

Related U.S. Application Data

(60) Provisional application No. 62/313,508, filed on Mar. 25, 2016.

(51) Int. Cl.
| | |
|---|---|
| *B25C 5/16* | (2006.01) |
| *B25C 5/11* | (2006.01) |
| *A01G 13/02* | (2006.01) |
| *B25C 5/02* | (2006.01) |
| *B25C 5/06* | (2006.01) |

(52) U.S. Cl.
CPC ........ *B25C 5/1665* (2013.01); *A01G 13/0293* (2013.01); *B25C 5/11* (2013.01); *B25C 5/16* (2013.01); *B25C 5/162* (2013.01); *B25C 5/025* (2013.01); *B25C 5/06* (2013.01)

(58) Field of Classification Search
CPC .. B25C 1/00; B25C 1/02; B25C 1/001; B25C 1/005; B25C 5/11; B25C 7/00; B25C 5/16; B25C 5/1665; B25C 5/025; B25C 5/06; E02D 7/04; E02D 17/20

USPC ............... 227/120, 134, 119, 123, 127, 147; 173/90, 170

See application file for complete search history.

(56) References Cited

U.S. PATENT DOCUMENTS

| | | | | |
|---|---|---|---|---|
| 2,289,308 A | * | 7/1942 | Fancher | B25C 5/025 227/123 |
| 2,409,049 A | * | 10/1946 | Lang | B25C 5/06 227/125 |
| 2,618,779 A | * | 11/1952 | Byard | B25C 5/16 227/125 |
| 2,801,417 A | * | 8/1957 | Jenny | B25C 1/041 227/123 |
| 2,857,596 A | * | 10/1958 | Allen | B25C 1/04 227/123 |
| 2,963,706 A | * | 12/1960 | Namanny | B25C 5/11 227/127 |

(Continued)

*Primary Examiner* — Scott A Smith
(74) *Attorney, Agent, or Firm* — Fredrikson & Byron, P.A.

(57) ABSTRACT

A staple insertion device includes a staple drive chamber, staple reservoir, staple feed mechanism, and staple drive member. The staple drive chamber is formed between a backing plate and a jam plate removably attached to the backing plate. The staple reservoir is configured to receive and hold a plurality of staples and extends from the backing plate to a staple reservoir terminal plate. The staple feed mechanism is operatively connected to the staple reservoir and is configured to feed the plurality of staples from the staple reservoir into the staple drive chamber through the backing plate. The staple drive member is configured to advance downwardly through the staple drive chamber so as to drive a staple out of the staple drive chamber.

7 Claims, 15 Drawing Sheets

(56) References Cited

U.S. PATENT DOCUMENTS

| | | | | |
|---|---|---|---|---|
| 3,041,614 | A * | 7/1962 | D Haem | B25C 5/16 227/123 |
| 3,140,492 | A * | 7/1964 | Bade | B25C 5/06 227/123 |
| 3,215,324 | A * | 11/1965 | Dorney | B25C 5/16 227/123 |
| 3,272,417 | A * | 9/1966 | Langas | B25C 5/0207 227/123 |
| 3,612,379 | A * | 10/1971 | Panock | B27F 7/34 227/8 |
| 3,807,619 | A * | 4/1974 | Doyle | B25C 5/0257 227/83 |
| 3,957,192 | A * | 5/1976 | Fehrs | B25C 5/06 227/123 |
| 4,087,035 | A * | 5/1978 | Harmon | B25C 5/06 227/120 |
| 4,380,312 | A * | 4/1983 | Landrus | B25C 5/06 227/116 |
| 4,627,563 | A | 12/1986 | Meyer | |
| 4,706,864 | A | 11/1987 | Jacobsen et al. | |
| 4,826,066 | A | 5/1989 | Koester | |
| 5,025,969 | A | 6/1991 | Koester et al. | |
| 5,163,596 | A * | 11/1992 | Ravoo | B25C 5/0285 227/109 |
| 5,931,364 | A * | 8/1999 | Dennis | B25C 5/06 227/109 |
| 6,450,388 | B1 * | 9/2002 | Denton | E01B 29/24 173/30 |
| 6,910,539 | B2 | 6/2005 | Carter | |
| 6,926,186 | B2 * | 8/2005 | Wells | B25C 5/11 173/90 |

\* cited by examiner

STAPLE INSERTION DEVICE

PRIORITY CLAIM

This application claims the benefit of U.S. provisional patent application No. 62/313,508 filed Mar. 25, 2016 the entire contents of which are hereby incorporated by reference.

TECHNICAL FIELD

This disclosure relates generally to staple insertion devices.

BACKGROUND

A staple insertion device, which may also be referred to as a staple gun, can be used to staple mats or other sheet materials to the ground. Such mats or other sheet materials are used in a variety of applications, such as to improve growing conditions and/or to control erosion. For example, following landscaping and construction projects, textile fabric may be laid on disturbed earth. The textile fabric, sometimes referred to as landscaping cloth, can be used to hold seed on the ground and to promote growth of grass or other flora on the disturbed soil. The textile fabric can help prevent erosion while plant root structures are growing to more permanently hold the soil in place. As another example, a textile fabric may be rolled over a soil roadway bed before depositing crushed gravel on the roadway bed during construction.

Independent of the application, it may be desirable to secure textile fabric or other material to prevent movement of the material. In the case of fabric laid over disturbed earth, staples may be used to secure the fabric to the underlying ground. This can require inserting a large number of stapes across the face of the fabric, particularly when the fabric is used in a large-scale construction project. The process of inserting staples can be even more challenging because the conditions in which fabric is deployed over disturbed ground, often muddy and wet, have a tendency to foul equipment used in the staple insertion process. Being able to efficiently secure the fabric to the ground can help ensure that a project remains on schedule and on budget.

SUMMARY

In general, this disclosure is directed to a staple insertion device. In some examples, the staple insertion device includes a staple reservoir that is sized and shaped to receive a magazine having multiple staples bonded together. The staple insertion device can also include a feed mechanism that biases against the back side of the staple magazine, pushing the staples toward a staple drive chamber. The staple drive chamber may form a cavity that is bounded on the front and back sides but open on the top and bottom ends. In operation, a staple drive member can be driven through the top open end of the staple drive chamber, shearing one staple from the staple magazine and driving the staple through the open bottom end of the chamber, e.g., into a textile fabric and the underlying ground.

Although the staple insertion device can have a variety of different configurations, in some applications, the staple insertion device includes a staple drive chamber that is formed by the combination of a backing plate and a jam plate. The backing plate may have a first face that bounds the staple drive chamber and a second, opposite face that bounds the staple reservoir. The jam plate may be removably secured to the first face of the backing plate and, in combination with the backing plate, form the staple drive chamber. For example, the jam plate may be removably secured to the backing plate using screws, bolts, clips, or other mechanical fixation elements that are repeatedly engageable and disengagable to repeatedly attach and remove the jam plate from the backing plate. Configuring the staple insertion device with a removable jam plate can be useful to provide quick access to the staple drive chamber. In instances where the staple drive chamber becomes jammed, for example because the chamber fills with mud or other debris and/or a staple becomes deformed within the chamber (e.g., by impacting a rock or tree root during discharge), the chamber can be quickly opened and cleaned. This can facilitate quick, in-the-field repairs, allowing the staple insertion device to be rapidly placed back in service following a jam incident.

In addition to or in lieu of configuring the staple insertion device with a removable jam plate, the staple insertion device may include a biasing member that is positioned to bias a staple magazine positioned into the staple reservoir toward the staple drive chamber. For example, the biasing member may be a spring that biases against a pushing member in contact with the back end of the staple magazine. In some configurations, the biasing member is a constant tension spring, such as a rolled ribbon spring, that provides a substantially constant tension on the pushing member across its entire range of travel over the length of the staple magazine. The constant tension spring may be centered on a spring shaft that is connected to and travels with the pushing member. For example, the constant tension spring may have a first end attached to the backing plate and a second end attached to the staple shaft. The constant tension spring may coil and retract as the pushing member travels toward the backing plate and uncoil and extend as the pushing member travels away from the backing plate.

Configuring the staple insertion device with a constant tension spring can make it easier to load a staple magazine into the staple reservoir. Instead of requiring the user to retract the staple feed mechanism against a spring that substantially increases in biasing force as the feed mechanism is drawn back, the constant tension spring may allow the feed mechanism to be drawn back comparatively easily. Moreover, in instances where multiple or split staple magazines are inserted into the staple reservoir (e.g., two or more sets of staples that are not attached together), the constant tension spring can help prevent one staple pack from riding up and over another staple pack, which may otherwise occur if using a compression spring in its most compressed position.

In one example, a staple insertion device is described that includes a staple drive chamber, staple reservoir, staple feed mechanism, and staple drive member. The staple drive chamber is formed between a backing plate and a jam plate removably attached to the backing plate so as to allow for removal of the jam plate and facilitate removal of a staple jammed within the staple drive chamber. The staple reservoir is configured to receive and hold a plurality of staples and extends from the backing plate to a staple reservoir terminal plate. The staple feed mechanism is operatively connected to the staple reservoir and is configured to feed the plurality of staples from the staple reservoir into the staple drive chamber through the backing plate. The staple drive member is configured to advance downwardly through the staple drive chamber so as to drive a staple out of the staple drive chamber.

In another example, a staple insertion device is described that includes a staple drive chamber, a staple reservoir, a staple feed mechanism, and a staple drive member. The staple drive chamber is formed between a backing plate and a facing plate. The staple reservoir extends from the backing plate of the staple drive chamber to a staple reservoir terminal plate and is configured to receive and hold a plurality of staples. The staple feed mechanism includes a pushing member connected to a spring. The spring biases the pushing member toward the staple drive chamber, thereby feeding the plurality of staples from the staple reservoir into the staple drive chamber through the backing plate. The staple drive member is vertically oriented with respect to the staple drive chamber and configured to advance downwardly through the staple drive chamber such that, when a staple is positioned in the staple drive chamber, the staple drive member drives the staple downwardly out of the staple drive chamber. The example specifies that the spring of the staple feed mechanism is a constant tension spring that provides a substantially constant tension on the pushing member across the pushing member's range of travel.

The details of one or more examples are set forth in the accompanying drawings and the description below. Other features, objects, and advantages will be apparent from the description and drawings, and from the claims.

DETAILED DESCRIPTION

A staple insertion device according to the disclosure can be used for a variety of applications to insert staples into objects. As examples, the staple insertion device may be used to drive one or more staples through various mats or other sheet like material (e.g., agricultural mats, erosion control mats) into the ground. In use, an operator may walk across or around the mat or other sheet like material and periodically engage the staple insertion device to insert one or more staples into the material. The staple insertion device may discharge one staple each time the device is actuated and automatically reset to discharge a subsequent staple.

While the staple insertion device can have a variety of different configurations as described herein, in some examples, the staple insertion device includes a staple drive reservoir that communicates with a staple reservoir holding multiple staples. The staple drive reservoir can have a discharge opening oriented downwardly with respect to ground. A staple drive member can translate from a position above the staple drive reservoir through the staple drive reservoir, thereby ejecting a staple from the reservoir into a substrate over which the discharge opening of the reservoir is positioned.

Figure 1:
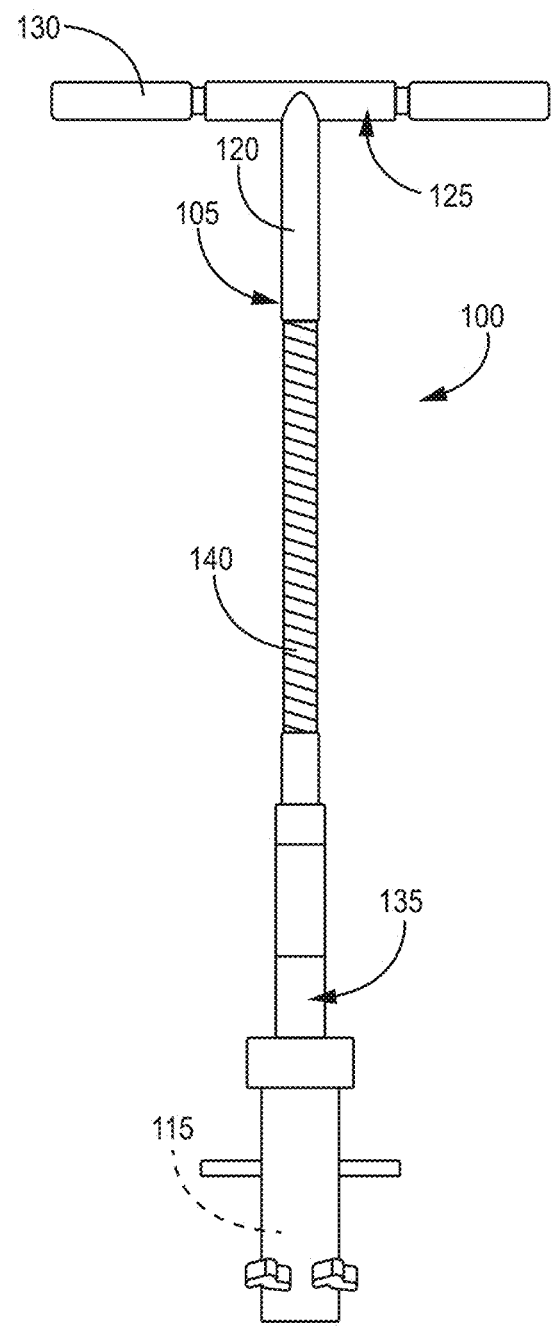
FIG. 1 is a front elevational view of an embodiment of a staple insertion device.
Figure 2:
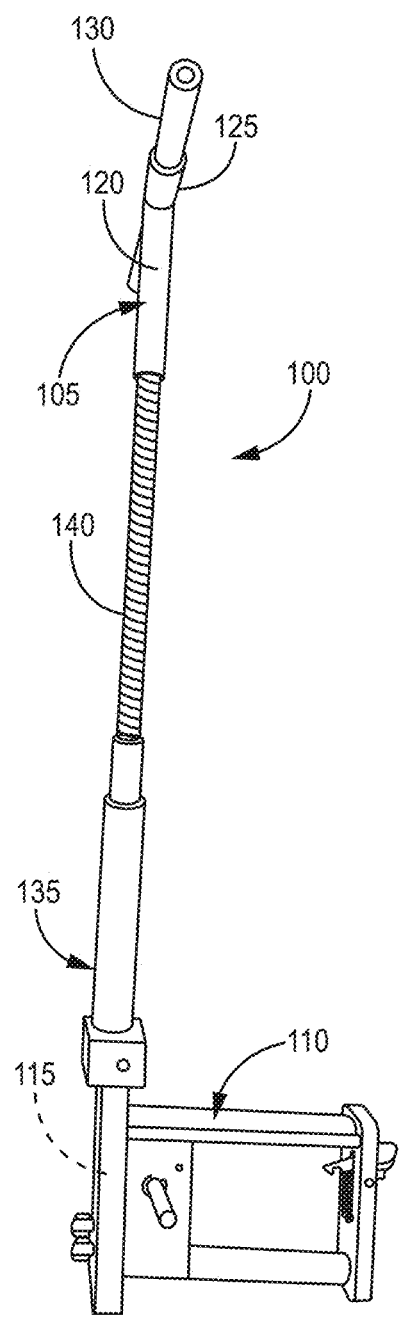
FIG. 2 is a side elevational view of the embodiment of the staple insertion device of FIG. 1.

FIGS. 1 and 2 illustrate an embodiment of a staple insertion device 100. In particular, FIG. 1 shows a front elevational view while FIG. 2 shows a side elevational view of the embodiment of the staple insertion device 100. The embodiment of the staple insertion device 100 includes a staple drive member 105, a staple reservoir 110, and a staple drive chamber 115.

Figure 13:
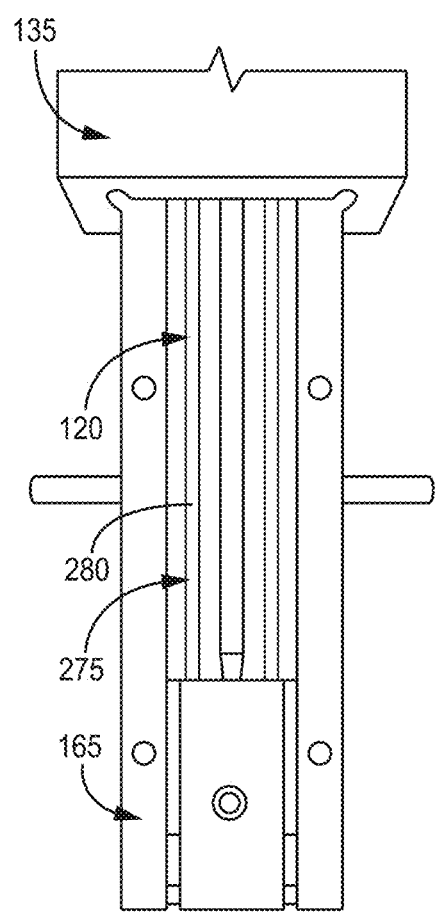
FIG. 13 is the front elevational view of FIG. 12 showing a portion of an embodiment of a staple drive member advanced downwardly.

In the example shown, the staple drive member 105 includes an elongated shaft 120 extending from a proximal end 125 and a distal end (shown in FIG. 13). As shown, the proximal end 125 can include handles 130, which may be used in one instance by a user to grip the staple insertion device 100. In the illustrated embodiment, a portion of the elongated shaft 120 (e.g., the distal end) is positioned inside of a staple drive member housing 135. The staple drive member 105 can be vertically oriented with respect to the staple drive chamber 115 and the staple drive member housing 135 can be positioned vertically above the staple drive chamber 115. The elongated shaft 120 may be operatively connected to a spring 140 that can bias the elongated shaft 120 away from the staple drive member housing 135. The staple drive member 105 can be configured to advance downwardly through the staple drive chamber 115 such that a staple positioned in the staple drive chamber 115 is driven downwardly out of the staple drive chamber 115 by the staple drive member 105. In one example, a user can grip the handles 130 and apply force downwardly on the drive member 105 causing the bias of the spring 140 to be overcome and the drive member 105 to be driven downwardly from the housing 135 and through the drive chamber 115.

Figure 3:
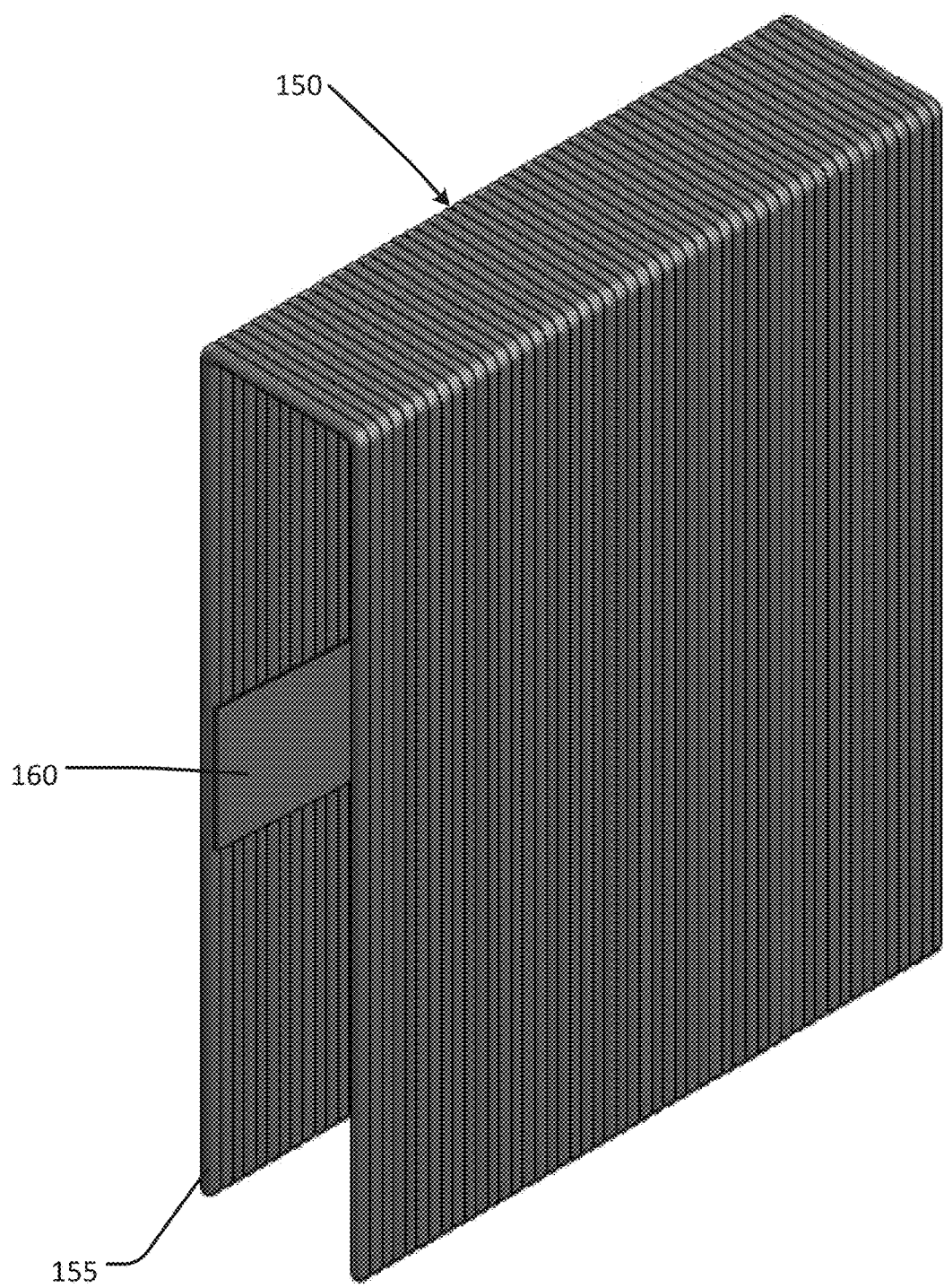
FIG. 3 is a perspective view of an embodiment of a band of staples.

FIG. 3 shows a perspective view of an embodiment of a band or magazine 150 of individual staples 155. The band 150 can be formed by releasably affixing a number of individual staples 155 together, such as by utilizing one or more strips 160. The staple reservoir 110 (shown, e.g., in FIG. 2) may be configured to receive and hold one or more staples 155 (e.g., one or more bands 150). The staple reservoir may thus serve as a holding zone for one or more individual staples 155 to be fed into the staple drive chamber, as will be described further with reference to FIGS. 4-7.

Figure 4:
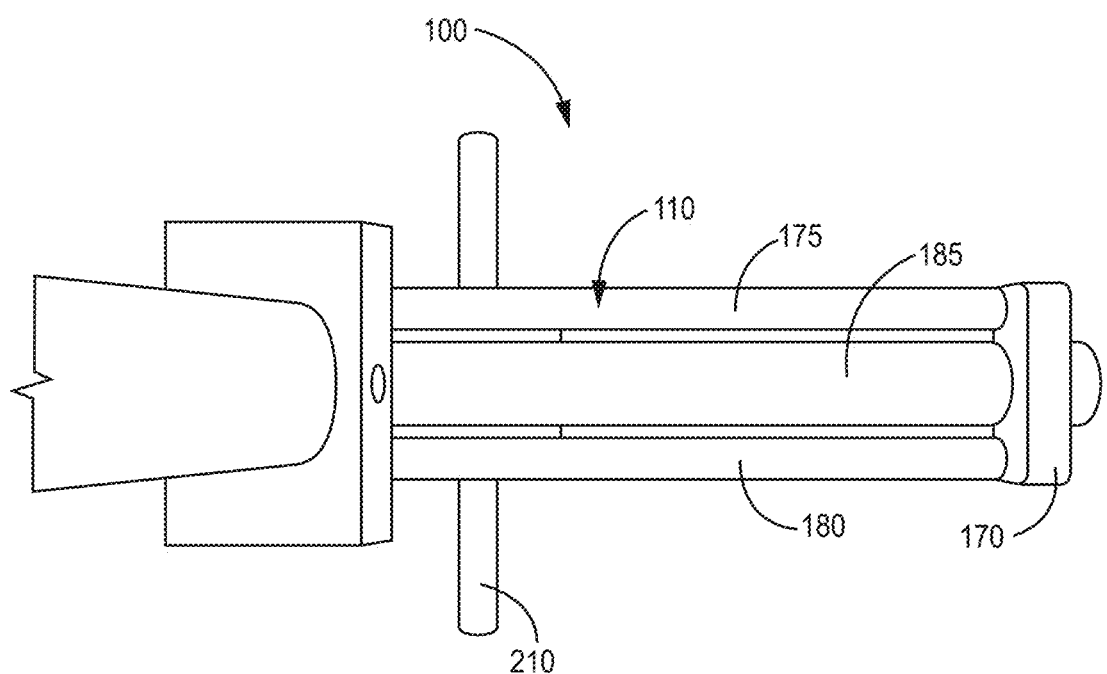
FIG. 4 is a top plan view of a portion of the embodiment of the staple insertion device of FIG. 1.
Figure 5:
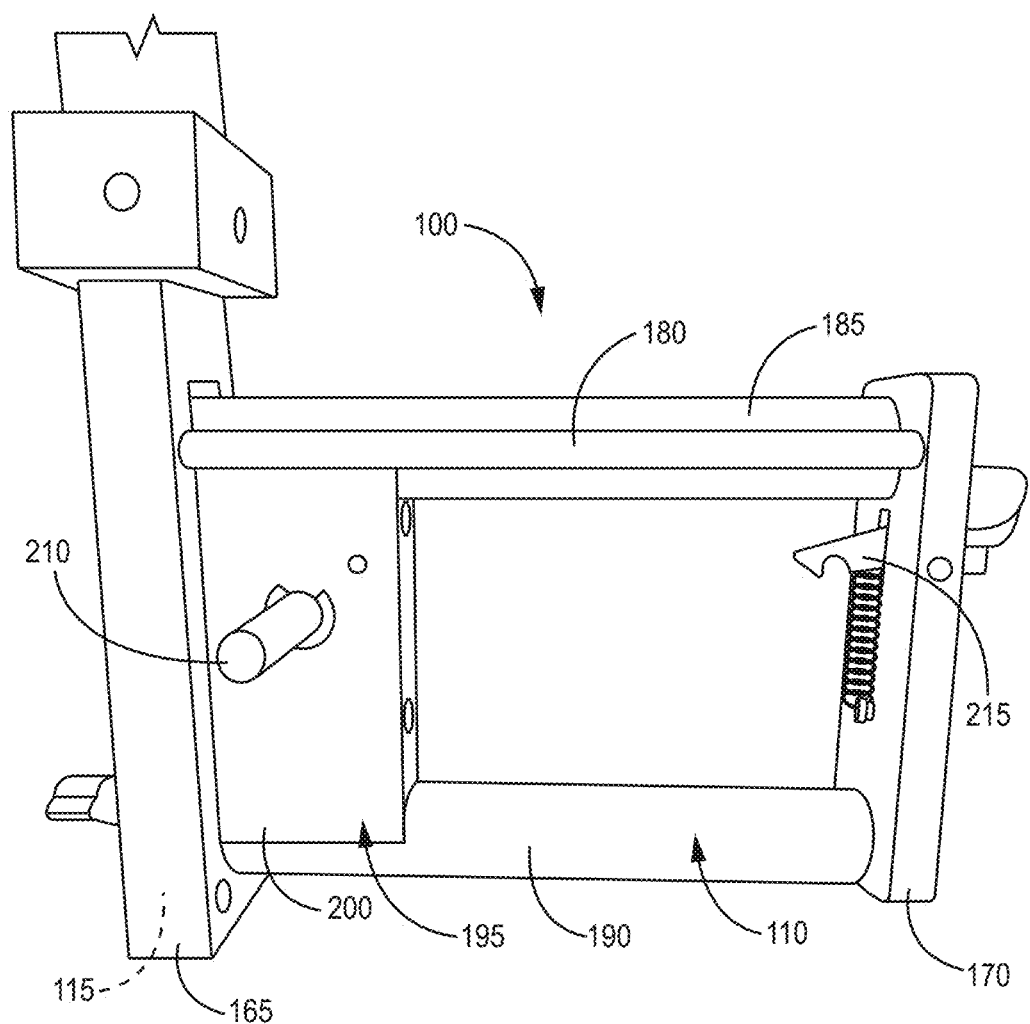
FIG. 5 is close-up, side elevational view of a portion of the embodiment of the staple insertion device of FIG. 1 showing an embodiment of a staple feed mechanism in a forward position.
Figure 6:
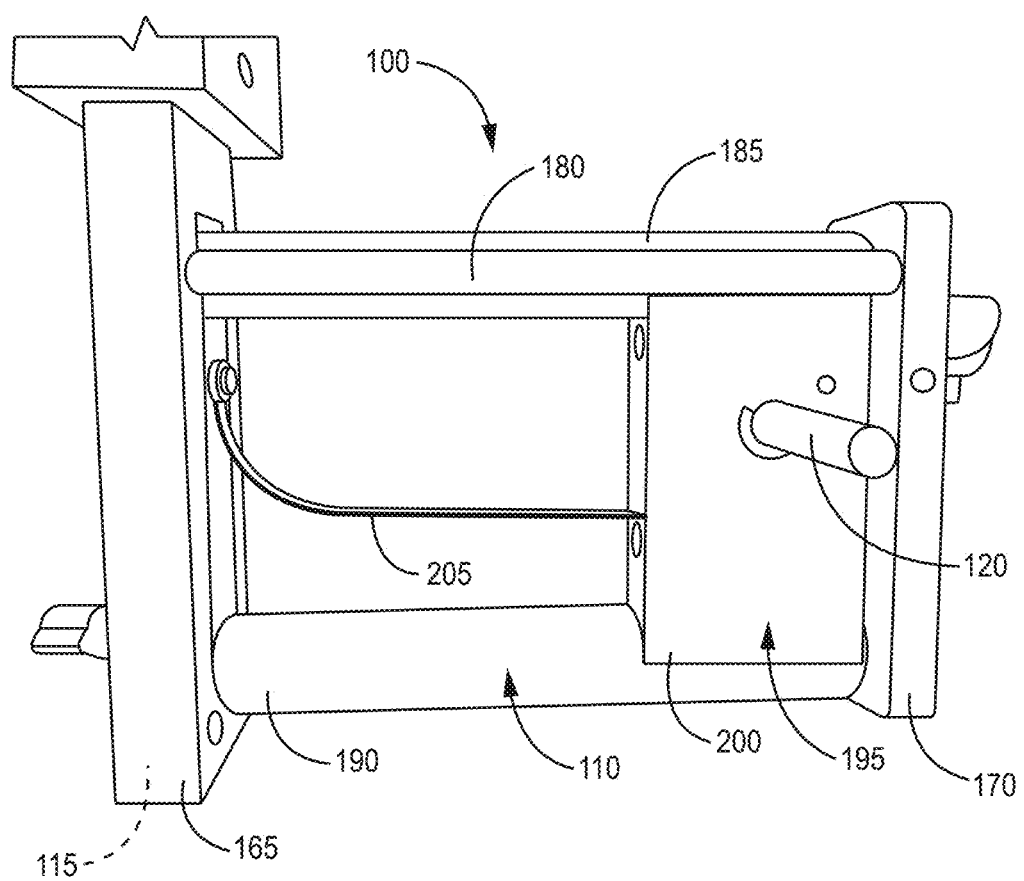
FIG. 6 is the close-up, side elevational view of the portion of the embodiment of the staple insertion device of FIG. 5 showing the embodiment of the staple feed mechanism in a retracted position.
Figure 7:
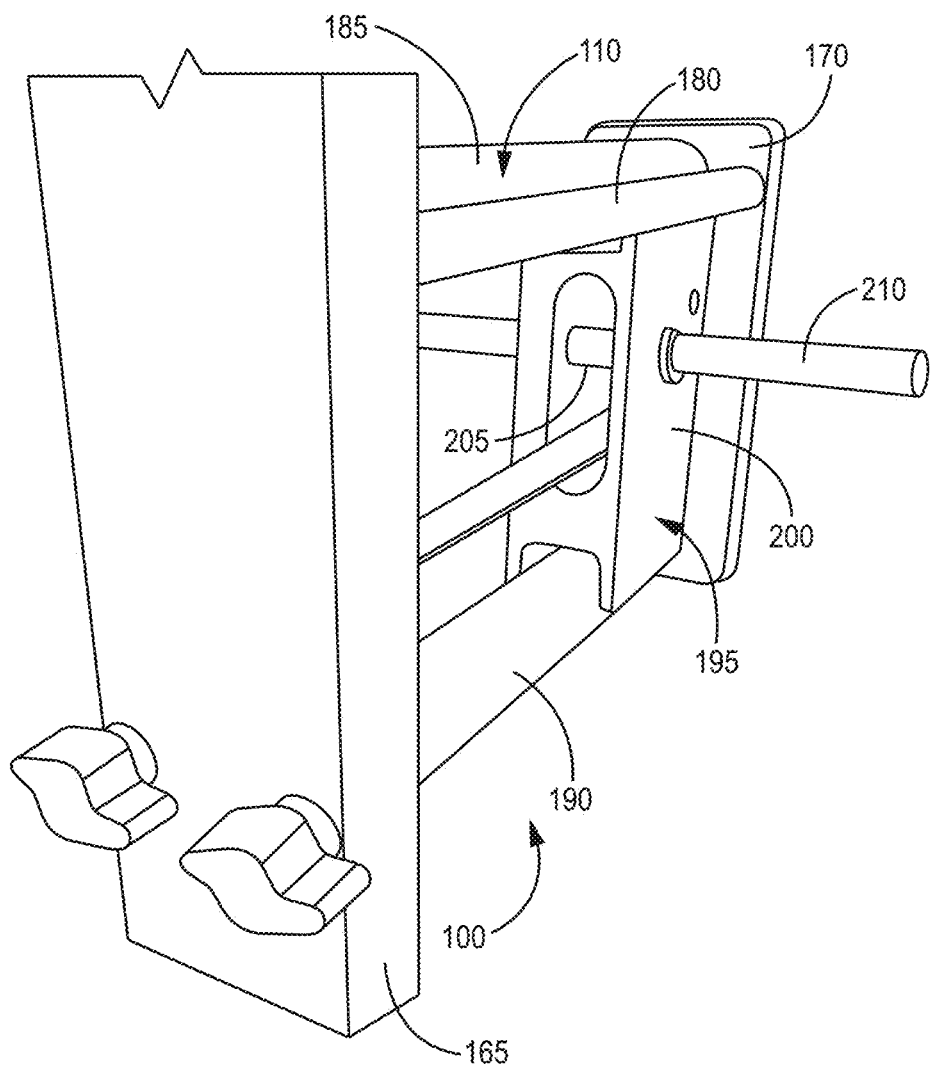
FIG. 7 is a perspective view of the portion of the embodiment of the staple insertion device of FIG. 6.

FIGS. 4-7 illustrate different views of the staple reservoir 110 of the staple insertion device 100 showing an example configuration of the staple reservoir. Specifically, FIG. 4 shows a top plan view, FIGS. 5 and 6 show side elevational views, and FIG. 7 shows a perspective view of the staple reservoir 110. The staple reservoir 110 can extend from a backing plate 165, of the staple drive chamber 115, to a staple reservoir terminal plate 170.

As noted, the staple reservoir 110 may be configured to receive and hold a plurality of staples. In particular, the staple reservoir 110 can include one or more rails, such as for receiving and/or holding one or more staples. The illustrated embodiment of the staple reservoir 110 includes a pair of horizontally spaced-apart rails 175, 180 configured, for instance, to receive a plurality of staples therebetween. The pair of horizontally spaced-apart rails 175, 180 may extend from the backing plate 165 to the terminal plate 170. The illustrated embodiment of the staple reservoir 110 also includes a pair of vertically spaced-apart rails 185, 190 which may also extend from the backing plate 165 to the terminal plate 170. In one example, a plurality of staples can be received and held by the staple reservoir 110 by inserting the plurality of staples over upper vertical rail 185 and between the pair of horizontally spaced-apart rails 175, 180.

The staple reservoir 110 can also include a staple feed mechanism 195. The staple feed mechanism 195 may be operatively connected to the staple reservoir 110 and configured to feed the plurality of staples held at the staple reservoir 110 into the staple drive chamber 115, such as through the backing plate 165. In the embodiment shown, the staple feed mechanism 195 includes a pushing member 200. The pushing member 200 may be configured to travel over a range of positions, such as between the backing plate 165 and the terminal plate 170 (as shown by the movement of the pushing member 200 between the positions shown in FIGS. 5 and 6). The range of movement of the pushing member 200 may facilitate both loading staples at the staple drive chamber 115 and feeding staples into the staple drive chamber 115.

The pushing member 200 can be connected to a spring 205. The spring 205 can act to bias the pushing member 200 toward the backing plate 165, and thus toward the staple drive chamber 115. In the illustrated example, the spring 205 is a constant tension spring, such as a rolled ribbon of spring steel. The constant tension spring can act to provide a substantially constant tension on the pushing member 200 across a range of travel of the pushing member 200 (e.g., the range of travel between the backing plate 165 and terminal plate 170). For instance, an amount of force provided by the constant tension spring on the pushing member 200 may vary by less than 25% across an entire range of travel of the pushing member 200, such as less than 10%. In the example shown, the spring 205 is connected to the pushing member 200 via a spring shaft 210. In particular, in this example the spring 205 is positioned on the spring shaft 210 which projects outwardly from the staple reservoir 110. In such an example, the spring shaft 210 can provide a handle for retracting the pushing member 200 toward the terminal plate 170, and thus overcoming the bias toward the backing plate 165.

When a user desires to load staples into the staple reservoir 110, the pushing member 200 may need to be retracted so as to create space within the staple reservoir 110 between the pushing member 200 and the backing plate 165 (e.g., in front of the pushing member 200). Because the pushing member 200 may be biased toward the backing plate 165, it can be useful to provide a means to hold the pushing member stationary at a retracted position. In the present embodiment, a catch 215 is positioned on the terminal plate 170. The catch 215 can be configured to catch and releasably hold the pushing member 200, such as when the pushing member 200 is retracted into abutting arrangement with the terminal plate as shown in FIG. 6. Thus, the releasable attachment between the catch 215 and the pushing member 200 can act to overcome the bias of the pushing member 200 toward the backing plate 165 and hold the pushing member 200 stationary while staples are loaded. When a desired number of staples are loaded into the staple reservoir 110, a user can release the catch from the pushing member 200, such that the bias force toward the backing plate 165 provided by the spring 205 acts to bring the pushing member 200 forward. This can act to secure the staples between the pushing member 200 and the backing plate 165, and feed staples into the staple drive chamber 115 as needed.

Figure 8:
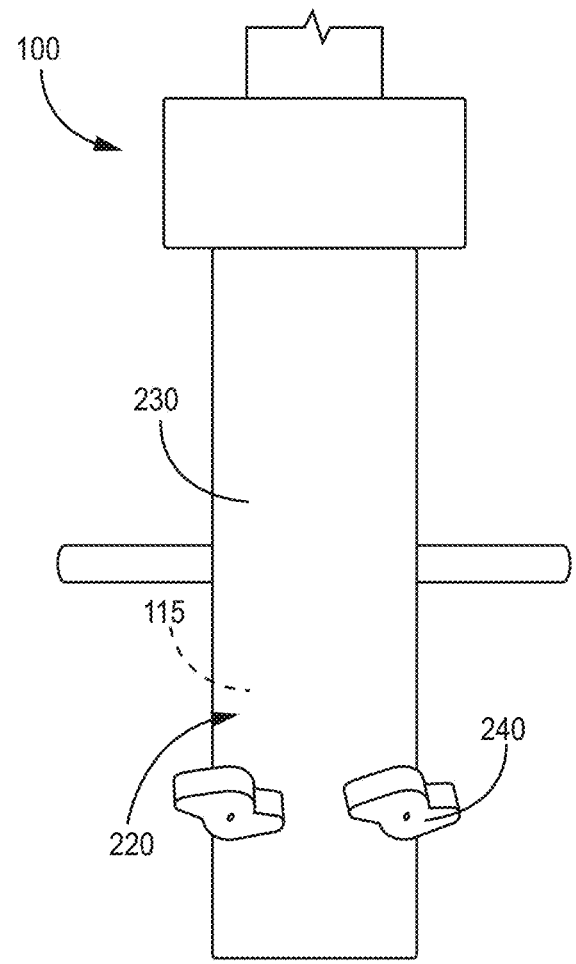
FIG. 8 is a close-up, front elevational view of a portion of the embodiment of the staple insertion device of FIG. 1.
Figure 9:
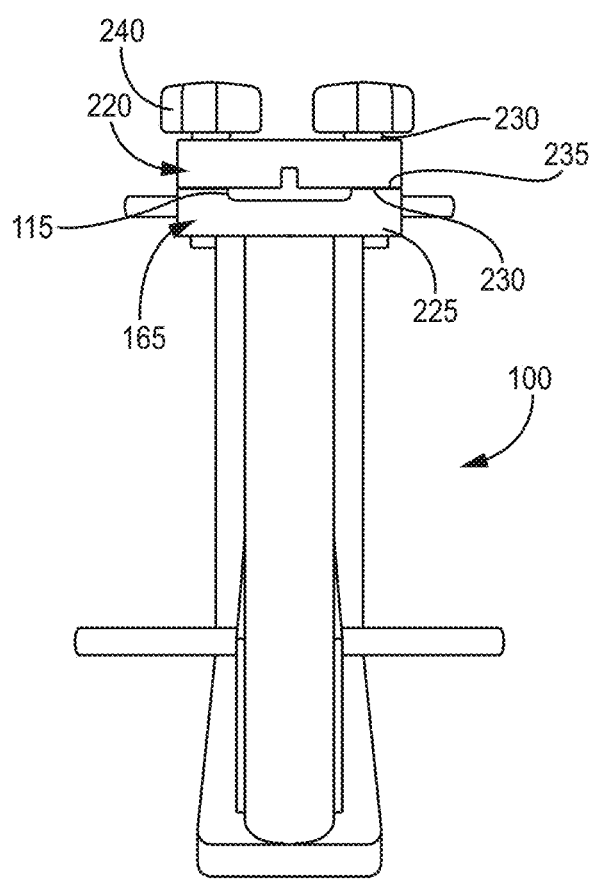
FIG. 9 is a bottom plan view of the embodiment of the staple insertion device of FIG. 1.

FIGS. 8 and 9 illustrate embodiments of the backing plate 165 and a jam plate 220 of the staple insertion device 100. In particular, FIG. 8 shows a front elevational view of a portion of the staple insertion device 100 having the jam plate 220, while FIG. 9 shows a bottom plan view of the staple insertion device 100.

In the embodiment shown, the staple drive chamber 115 is formed between the backing plate 165 and the jam plate 220. The backing plate 165 includes an external face 225 and an internal face 230 that is on an opposite side of the backing plate relative to the external face 225. The jam plate 220 similarly includes an external face 230 and an internal face 235 that is on an opposite side of the backing plate relative to the external face 230. As shown, the internal face 235 of the jam plate 220 is in contact with the internal face 230 of the backing plate 165 when the jam plate 220 is attached to the backing plate 165. Such configuration can therefore act to define the staple drive chamber 115 between the internal faces 230, 235. Therefore, in this example the staple drive chamber 115 may have a width defined by a distance between the internal face 235 of the jam plate 220 and the internal face 230 of the backing plate 165. In some cases, the width of the staple drive chamber 115 is sufficiently small to receive only a single staple at a time.

In some embodiments, the jam plate 220 may be removably attached to the backing plate 165. By removably attaching the jam plate 220 to the backing plate 165, the jam plate 220 may be removed from the backing plate 165 allowing, for instance, a staple jammed within the staple drive chamber 115 to be quickly and easily removed. In the example shown, the jam plate 220 is removably attached to the backing plate 165 via one or more attachment members 240. The one or more attachment members 240 can be any mechanism suitably for removably securing the jam plate 220 to the backing plate 165, and could be a thumbscrew as shown here.

Figure 10:
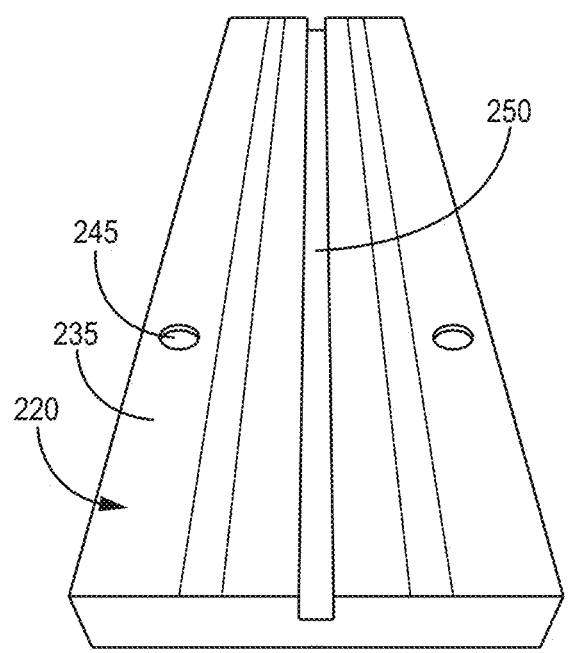
FIG. 10 is perspective view of an embodiment of a jam plate removed from the embodiment of the staple insertion device of FIG. 1.

FIG. 10 shows a perspective view of the embodiment of the jam plate 220, as discussed in connection with FIGS. 8 and 9, removed from the staple insertion device (e.g., removed from an attachment to the backing plate). Specifically, FIG. 10 shows the internal face 235 of the jam plate 220. As illustrated, the jam plate 220 may define one or more attachment member receiving apertures 245. The jam plate 220 can be removably attached to the backing plate by inserting an attachment member through the attachment member receiving aperture 245 and into the backing plate. The internal face 235 of the jam plate 220 as shown in FIG. 10 further defines a jam plate channel 250, which can facilitate movement of any protruding surface at or near a distal end of the elongated shaft as it moves downward through the staple drive chamber.

Figure 11:
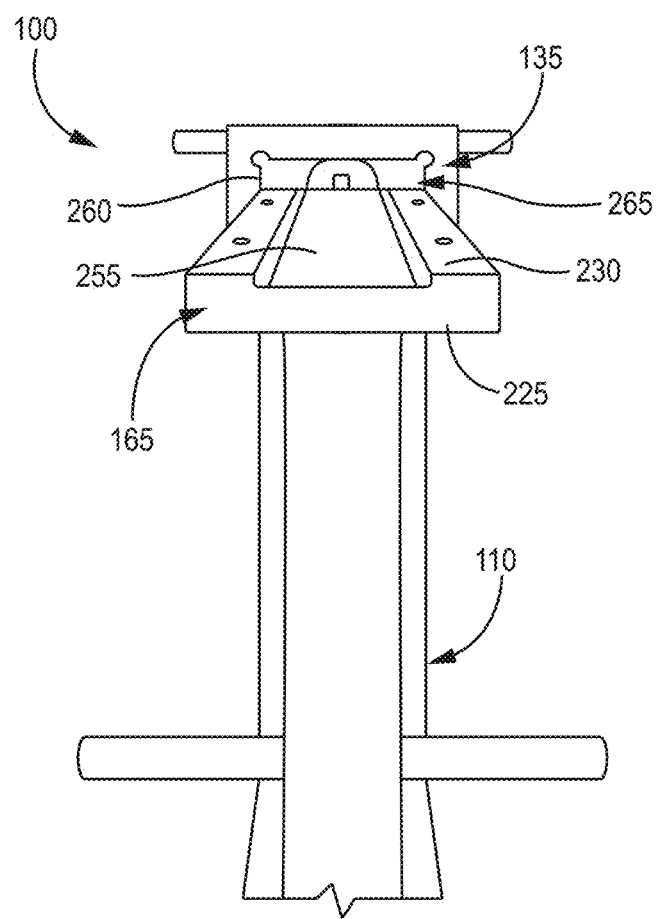
FIG. 11 is a bottom perspective view of the embodiment of the staple insertion device of FIG. 1 with the jam plate removed.

FIG. 11 shows a bottom perspective view of the staple insertion device 100 with the jam plate removed. As shown in the illustrated embodiment, the backing plate 165 can have a recess 255 formed on the internal face 230. One purpose of the recess 255 formed on the internal face 230 can be to provide the staple drive chamber. In other embodiments, the recess can be formed on the internal face of the jam plate, in addition to or as an alternative to forming the recess on the internal face 230 of the backing plate 165.

Also shown in FIG. 11 is a bottom portion of the staple drive member housing 135. In various embodiments, the staple drive member housing 135 may include a downwardly oriented recessed cavity 260. The recessed cavity 260 can be sized to receive the backing plate 165, as well as the jam plate when attached. For example, a top portion 265 of the backing plate 165 may be inserted into the recessed cavity 260 and held in place thereat by any suitable attachment member(s). In some examples, the backing plate 165 can be removably attached to the staple drive member housing 135 so as to allow the backing plate 165 to be removed, for instance when the backing plate needs to be replaced. The jam plate may be received within the recessed cavity 260 as well, such as by inserting a top portion of the jam plate within the recessed cavity 260. In some such cases, it may not be necessary to attach the jam plate to the staple drive member housing 135 when the jam plate is received within the recessed cavity 235 if the jam plate is removably attached to the backing plate 165 as described previously.

Figure 12:
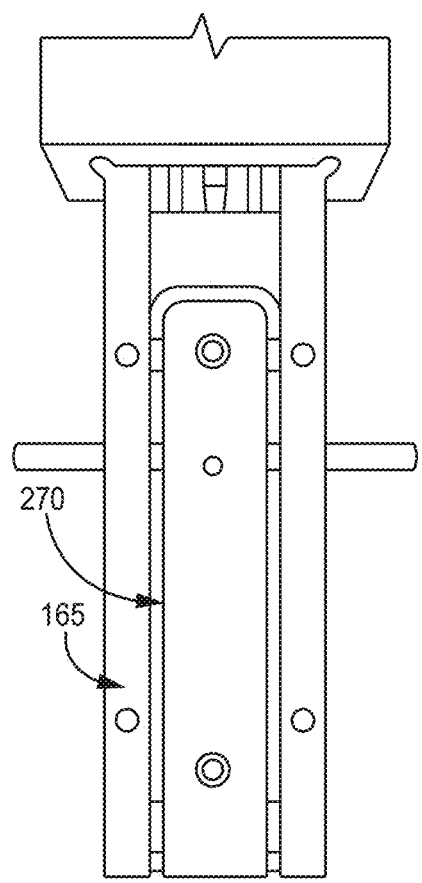
FIG. 12 is a front elevational view of a portion of the embodiment of the staple insertion device of FIG. 11.

FIGS. 12 and 13 illustrate front elevational views of the embodiment of the backing plate 165. In addition to those features of the backing plate 165 described previously, the backing plate 165 can also define a staple-shaped opening 270 extending therethrough. The staple-shaped opening 270 can be dimensioned as appropriate depending on the size of staple to be used in an intended application of the staple insertion device. The staple feed mechanism, as described previously, is configured to bias staples held within the staple reservoir toward the backing plate 165 and through the staple-shaped opening 270. In an embodiment where the staple feed mechanism includes the pushing member and constant tension spring, the constant tension spring biases the pushing member toward the staple drive chamber (and thus the backing plate 165) causing the springs within the staple reservoir to be pushed through the staple-shaped opening 270. As also noted previously, in some embodiments the staple drive chamber may define a width sufficiently small to receive only a single staple at a time. In such embodiments, this width of the staple drive chamber can act to allow only one spring at a time to be fed through the staple-shaped opening 270 and into the staple drive chamber.

When a staple is fed through the staple-shaped opening 270 and positioned in the staple drive chamber, the staple drive member may drive the staple downwardly and out of the staple drive chamber. As one example, FIG. 13 shows a distal end 275 of the elongated shaft 120 advancing downwardly through the drive member housing 135 to drive the staple out of the staple drive chamber. The distal end 275 of the elongated shaft 120 may include a blade 280 configured to contact the staple when the elongated shaft 120 is advanced downwardly. In the illustrated embodiment, the blade 280 includes a cross-sectional T-shape geometry. Where such a blade geometry is present, the previously described jam plate channel can receive the portion of the blade protruding outward toward the jam plate.

Figure 14:
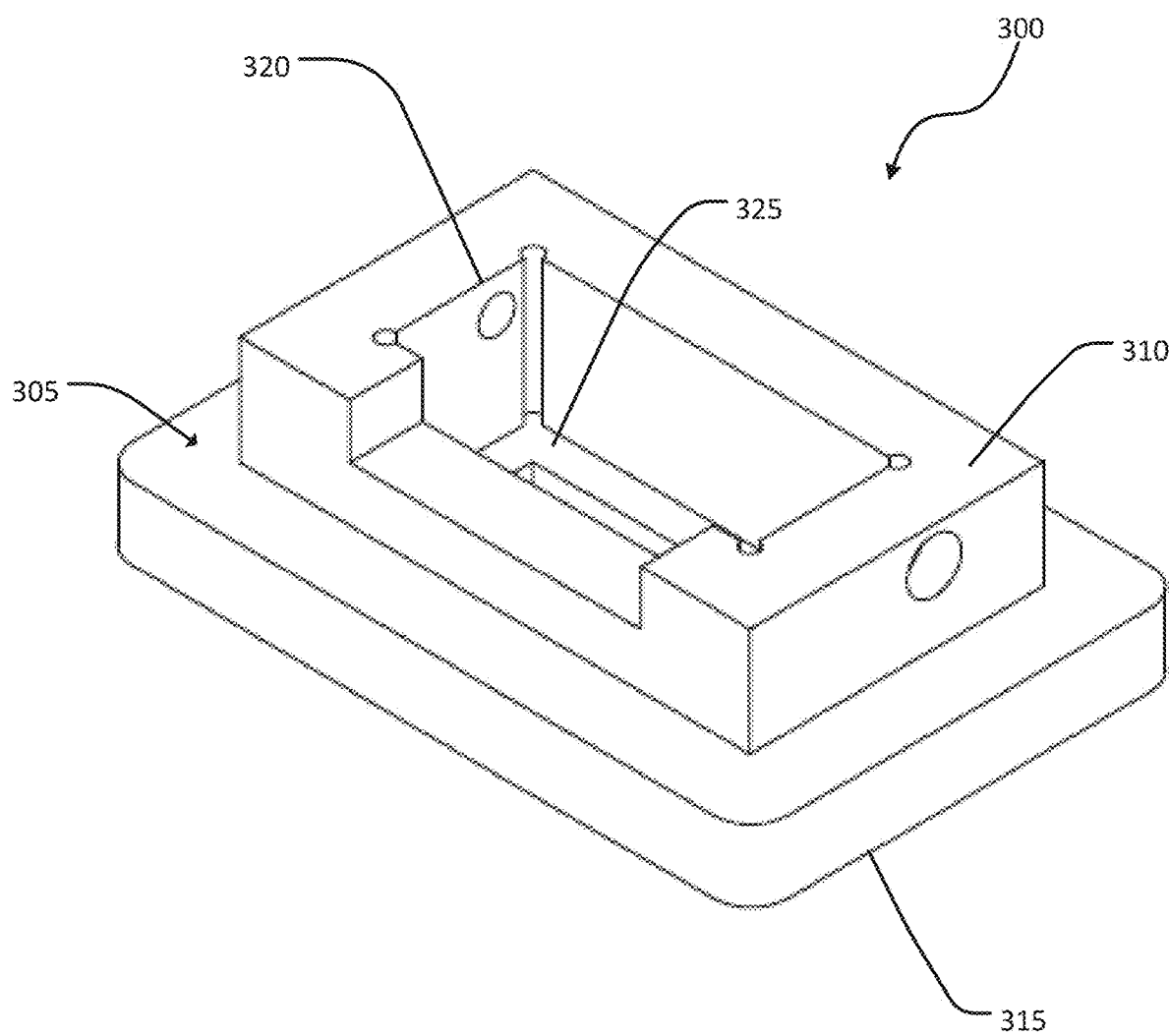
FIG. 14 is a perspective view of a shoe attachment for use with embodiments of the staple insertion device.

FIG. 14 shows a perspective view of an embodiment of a shoe attachment 300 that can be used with the staple insertion device described herein. The shoe attachment 300 includes a body 305 having a top side 310 and a bottom side 315. The body 305 defines an opening 320 therethrough from the top side 310 to the bottom side 315. A surface 325 can protrude inward within the opening 320 at a location within the opening 320 spaced from the top side 310. In one example, the surface 325 can extend along an entire perimeter of the opening 320 at the location within the opening 320 spaced from the top side 310.

The shoe attachment 300 can be removably attached to the staple insertion device during use of the staple insertion device. In one example, the shoe attachment can be removably attached to the staple insertion device at a bottom side of the backing and terminal plates (e.g., opposite the staple drive member housing; at the outlet of the staple drive chamber). In this exemplary configuration, the backing and terminal plates can extend at least partially within the opening 320. In one embodiment, the bottom side 315 can be a point of contact with a ground or other surface into which the staple is to be driven while the backing and terminal plates are held within the opening 320 without extending out from the opening 320. In one instance, the surface 325 can be adapted to serve as a contact surface for an end of the backing and/or terminal plate.

As one example, the shoe attachment 300 may be useful in providing greater stability to the staple insertion device since the shoe attachment 300 may provide an increased contact surface area on the staple insertion device. This can be particularly beneficial, for instance, when the staple insertion device is used to drive staples into relatively soft ground because the increased contact surface area between the shoe attachment 300 and the soft ground may help to prevent the staple insertion device from sinking too far into the soft ground during use. Otherwise, any blankets, coverings, or other materials overlaying the ground and interfacing with the staple insertion device could be ripped, or otherwise damaged, due to the staple insertion device sinking into the ground. Thus, the shoe attachment 300 can provide greater stability to the staple insertion device while still allowing staples to be driven out from the staple drive chamber as described previously herein.

Figure 15:
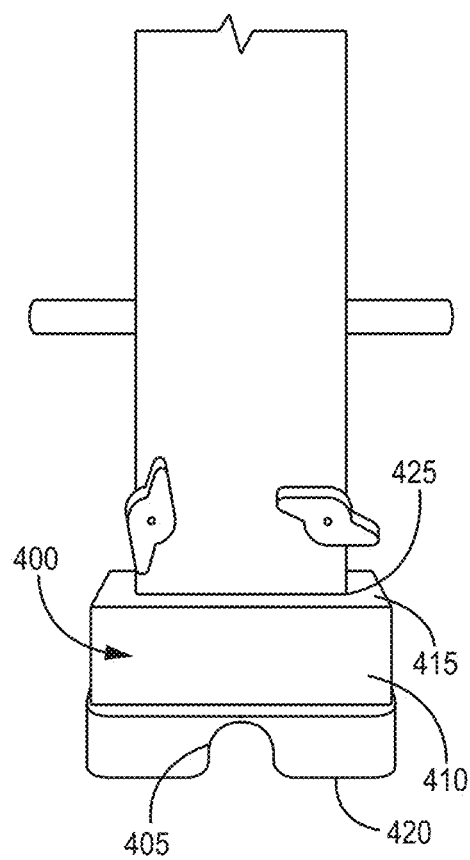
FIG. 15 is a front elevational view of an alignment attachment used with an embodiment of the staple insertion device.

FIG. 15 is a front elevational view of an embodiment of an alignment attachment 400 used with the staple insertion device described herein. In some examples, the alignment attachment 400 can be similar to the shoe attachment described with reference to FIG. 14 but with the addition of one or more notches 405. In addition to the notches 405, the exemplary alignment attachment 400 includes a body 410 having a top side 415 and a bottom side 420. The body 410 defines an opening 425 therethrough from the top side 415 to the bottom side 420. A surface (not shown) can protrude inward within the opening 425 at a location within the opening 425 spaced from the top side 415.

As noted, the alignment attachment 400 includes one or more notches 405. For example, the alignment attachment 400 can include two notches 405—one at the front side of the body 410 shown in FIG. 15 and another at an opposite back side of the body 410 (not seen in FIG. 15). In such an example, the two notches 405 can be aligned at a location along the respective front and back side of the body 410. As shown, the notches 405 define a recess in the body 410 that extends from the bottom side 420 toward the top side 415.

The alignment attachment 400 can be removably attached to the staple insertion device during use of the staple insertion device. In one example, the alignment attachment 400 can be removably attached to the staple insertion device at a bottom side of the backing and terminal plates (e.g., opposite the staple drive member housing; at the outlet of the staple drive chamber). In this exemplary configuration, the backing and terminal plates can extend at least partially within the opening 425. In one embodiment, the bottom side 420 can be a point of contact with a ground or other surface into which the staple is to be driven while the backing and terminal plates are held within the opening 425 without extending out from the opening 425.

When attached to the staple insertion device, as shown in FIG. 15, the alignment attachment 400 can be useful in aligning a staple relative to a tube or other lining (e.g., irrigation tubing) extending along a ground surface. For instance, the notches 405 can serve to align this tube relative to a staple, within the staple drive chamber of the staple insertion device, such that the staple when driven secures the tube to the ground surface without being driven through the tube (e.g., the staple bounds the tube between it). The notches 405 can be placed on the tube such that the tube sits within the respective recesses defined by the notches 405 at the bottom side 420. To facilitate the described alignment of the staple relative to the tube, the notches 405 can have a width at the bottom side 420 that is less than the width of the staple drive chamber of the staple insertion device. In addition, the notches 405 may be aligned at a location along the respective front and back side of the body 410 such that a center of each notch 405 is aligned with a center of the staple drive chamber. In this way, aligning the tube with the notches 405 will prevent the staple within the staple drive chamber from damaging the tube when the staple is driven out from the staple drive chamber. The alignment attachment 400 can also serve to provide stability to the staple insertion device as described previously in connection with the shoe attachment.

Various examples have been described. These and other examples are within the scope of the following claims.

The invention claimed is:

1. A staple insertion device comprising:
    a staple drive chamber formed between a backing plate and a jam plate;
    a staple reservoir extending from the backing plate of the staple drive chamber to a staple reservoir terminal plate, the staple reservoir being configured to receive and hold a plurality of staples;
    a staple feed mechanism operatively connected to the staple reservoir and configured to feed the plurality of staples from the staple reservoir into the staple drive chamber through the backing plate; and
    a staple drive member vertically oriented with respect to the staple drive chamber and configured to advance downwardly through the staple drive chamber such that, when a staple is positioned in the staple drive chamber, the staple drive member drives the staple downwardly out of the staple drive chamber,
    wherein the jam plate is removably attached to the backing plate, thereby allowing the jam plate to be removed from the backing plate to remove jammed staples from the staple drive chamber, and wherein the staple reservoir comprises a pair of vertically spaced-apart rails extending from the terminal plate to the backing plate and a pair of horizontally spaced-apart rails extending from the terminal plate to the backing plate, the staple feed mechanism rides along the pair of vertically spaced-apart rails, and the pair of horizontally spaced-apart rails are configured to receive the plurality of staples by inserting the plurality of staples over an uppermost of the pair of vertically spaced-apart rails and between the horizontally spaced-apart rails.

2. The device of claim 1, wherein the staple drive member comprises an elongated shaft extending from a proximal end to a distal end and has a blade positioned on the distal end, the blade being configured to contact the staple when advancing the elongated shaft downwardly.

3. The device of claim 1, wherein the jam plate has an external face and an internal face opposite the external face, the backing plate has an external face and an internal face opposite the external face, the internal face of the jam plate is in contact with the internal face of the backing plate when the jam plate is removably attached to the backing plate, and at least one of the internal face of the jam plate and the internal face of the backing plate has a recess formed therein to provide the staple drive chamber.

4. The device of claim 3, wherein the internal face of the backing plate has the recess formed therein, the backing plate further having a staple-shaped opening extending therethrough, wherein the staple feed mechanism is configured to bias the plurality of staples in the staple reservoir through the staple-shaped opening.

5. The device of claim 1, wherein the staple feed mechanism comprises a pushing member connected to a spring that biases the pushing member toward the staple drive chamber.

6. The device of claim 5, wherein the spring is a constant tension spring that provides a substantially constant tension on the pushing member across the pushing member's range of travel.

7. The device of claim 1, further comprising a staple drive member housing positioned vertically above the staple drive chamber, wherein the staple drive member comprises an elongated shaft operatively connected to a spring that biases the elongated shaft away from the staple drive member housing and a distal end of the elongated shaft is positioned inside of the staple drive member housing, the distal end of the elongated shaft being configured to advance through the drive member housing to drive the staple out of the staple drive chamber.

* * * * *